United States Patent [19]

Heins et al.

[11] Patent Number: 5,173,466
[45] Date of Patent: Dec. 22, 1992

[54] CATALYST FOR THE REDUCTION OF NITROGEN OXIDES FROM WASTE GASES AND A PROCESS FOR ITS PRODUCTION

[75] Inventors: Hans-Hermann Heins, Leverkusen; Peter Danz, Cologne; Martin Ullrich, Leverkusen; Hanno Henkel, Krefeld; Klaus Holzer, Leverkusen; Eberhard Zirngiebl, Cologne; Siegfried Gruhl, Engelskirchen, all of Fed. Rep. of Germany

[73] Assignee: Bayer Aktiengesellschaft, Leverkusen, Fed. Rep. of Germany

[21] Appl. No.: 770,201

[22] Filed: Oct. 2, 1991

[30] Foreign Application Priority Data

Oct. 9, 1990 [DE] Fed. Rep. of Germany ....... 4031968

[51] Int. Cl.$^5$ .................. B01J 21/18; B01J 23/64; B01J 31/06; C01B 31/10
[52] U.S. Cl. .................. 502/182; 423/239; 502/159; 502/180
[58] Field of Search ............. 502/182, 180, 159, 162, 502/167, 417

[56] References Cited

U.S. PATENT DOCUMENTS

| | | | |
|---|---|---|---|
| 4,067,956 | 1/1978 | Franklin et al. | 423/445 |
| 4,992,404 | 2/1991 | Gruhl et al. | 502/182 |
| 5,064,801 | 11/1991 | Jungten et al. | 502/180 |

FOREIGN PATENT DOCUMENTS

| | | |
|---|---|---|
| 2458388 | 6/1975 | Fed. Rep. of Germany . |
| 2911712 | 9/1980 | Fed. Rep. of Germany . |
| 3727642 | 3/1989 | Fed. Rep. of Germany . |
| 3727643 | 3/1989 | Fed. Rep. of Germany . |
| 3837358 | 5/1990 | Fed. Rep. of Germany . |
| 2231621 | 12/1974 | France . |

Primary Examiner—Paul E. Konopka
Attorney, Agent, or Firm—Sprung Horn Kramer & Woods

[57] ABSTRACT

A carbon- and nitrogen-based catalyst consisting essentially of active carbon or active coke and comprising at least 90% by weight of graphite structures containing at least 10% of pores larger than 100 nm in diameter and having incorporated therein an isocyanate which forms C-N-ring structures, the percentage graphite content being at least 90% by weight. The catalayst is especially effective in the low temperature reduction of nitrogen oxides in waste gases.

7 Claims, No Drawings

CATALYST FOR THE REDUCTION OF NITROGEN OXIDES FROM WASTE GASES AND A PROCESS FOR ITS PRODUCTION

This invention relates to catalysts based on carbon and nitrogen for the reduction of nitrogen oxides from waste gases and to a process for the production of the catalysts.

In general, nitrogen oxides are selectively removed from waste gases by reduction with ammonia. Without a catalyst, this reaction takes place in the gas phase at temperatures of around 900° C. With special catalysts, it is possible to lower these temperatures. Low temperatures are desirable in this regard to avoid expensive heating of the waste gas, particularly after desulfurization. In addition to a substantially complete conversion and high catalytic efficiency, an industrial catalyst is expected to have a long useful life and to show low pressure loss values.

Certain materials, such as inorganic oxides for example, are desirable large-surface supports for catalytically active materials. In many catalytic processes, more particularly gas/solids reactions, the optimal catalytic activity of materials such as these doped with corresponding catalytically active elements is only developed at relatively high temperatures.

In the widely used selective catalytic reduction (SCR) process using catalysts on $TiO_2$ supports, temperatures above 300° C. are required so that, in some cases, the gases have to be reheated, which is not economical. In addition, the catalysts suitable for such processes (DE-C 2 458 888) are expensive to produce.

DE-A 2 911 712 describes the catalytic degradation of $NO_x$ with ammonia on active coke at temperatures of around 150° C. However, the disadvantage of this process is the fact that very large quantities of coal are required.

In addition, it is known from DE-OSS 37 27 642 and 37 27 643 that carbon-based catalysts, which contain poorly soluble oxides of certain metals and which are produced by pyrolysis from organic materials containing unsaturated carbon-carbon groups, may be used for the reduction of $NO_x$. The disadvantage of these catalysts is that the pyrolysis of the organic materials is very complicated and leads to extremely inhomogenous products.

Accordingly, the problem addressed by the present invention was to provide catalysts which show high catalytic efficiency, are easy to produce, can be used at low temperatures and do not have the above-mentioned disadvantages of hitherto known catalysts. Another problem addressed by the invention was to provide a process for the production of these catalysts.

These problems have been solved by the catalysts according to the invention and by the process according to the invention.

The present invention relates to catalysts based on carbon and nitrogen which are characterized in that they consist essentially of active carbon or active coke based on graphite structures wherein 10% of the total pore volume is established by pores larger than 100 nm in diameter and isocyanates forming C-N-ring structures incorporated therein and in that the percentage graphite content is at least 90% by weight.

In a preferred embodiment, the catalysts additionally contain up to 1% by weight vanadium oxide, e.g. about 0.1 to 1%.

Toluene diisocyanate, oligomers of toluene diisocyanate and/or residues from the production of toluene diisocyanate are used as the polymerizable isocyanates forming C-N-ring structures.

The present invention also relates to a process for the production of the catalysts according to the invention which is characterized in that active carbon or active coke made up of graphite structures and containing at least 10% by volume of pores larger than 100 nm in diameter based on the total pore volume is initially introduced, polymerizable isocyanates or isocyanate residues forming C-N-ring structures are uniformly distributed over the active carbon or the active coke which is then heated to temperatures of 80° to 150° C., subsequently conditioned at 300° to 500° C. and then treated with steam at temperatures of 700° to 900° C.

The process according to the invention is preferably carried out in a rotary kiln, preferably discontinuously.

The catalysts according to the invention may also be produced by initially introducing carbon powder or active carbon powder instead of active carbon or active coke, mixing and subsequently granulating polymerizable isocyanates or isocyanate residues forming C-N-ring structures with the powder, subsequently heating the granules to temperatures of 80° to 150° C., the isocyanates or isocyanate residues polymerizing, subsequently conditioning the granules at 300° to 500° C. and then subjecting them to treatment with steam at temperatures of 700° to 900° C.

The active carbon treated with the isocyanates is preferably heated to 90°-120° C., preferably conditioned at 350° to 450° C. and preferably treated at temperatures of 750° to 850° C.

The catalysts according to the invention are used for the reduction of nitrogen oxides from waste gases at low temperatures, preferably at 100° to 150° C., and more particularly for the reduction of nitrogen oxides with simultaneous adsorption of dioxins and furans from waste gases.

A major advantage of the catalysts according to the invention is that they show high activity, so that only small quantities are required for the reduction of nitrogen oxides. At the same time, this has a positive effect on the pressure loss, for example in fixed beds installed in the waste gas stream to be purified. Another advantage of the catalysts according to the invention is that they can be used for the reduction of $NO_x$ at low temperatures (100° to 150° C.). Accordingly, there is also generally no need to heat the waste gases to be purified. Moreover, the constituent materials of the corresponding apparatus do not have to meet such stringent requirements.

The invention is illustrated by the following Examples.

EXAMPLE 1

Production of the Catalyst

Active carbon based on graphite structures is mixed with 40% toluene diisocyanate residues and 4% water for 30 minutes at room temperature in a rotary kiln. The temperature is then increased to 90° C. and is kept at that level for 1 hour. The oven is then heated to 500° C. over a period of 180 minutes, after which the coal is treated with steam for 120 minutes at 800° C. The total pore volume was 59.1% of the catalyst volume. 43.7% of the pore volume was represented by pores of diameter larger than 100 nm.

EXAMPLE 2

Production of the Catalyst

Coal dust is mixed with the same quantity of toluene diisocyanate residue and the resulting mixture is granulated by extrusion. The granules are then heated for 1 hour to 120° C. in a rotary kiln, the toluene diisocyanate polymerizing. The product is then conditioned for 4 hours at 450° C. and treated with steam for 2 hours at 800° C.

EXAMPLE 3

Reduction of $NO_x$

The catalyst of Examples 1 and 2 was tested in a heated 35 mm diameter column filled to a height of 400 mm. 500 ppm NO and 350 ppm $NH_3$ were added to room air which was then passed through the catalyst layer at 130° C. at a spatial velocity of 1,000 $m^3/m^3h$. 90% of the NO were reduced.

In the same test as described above, but with untreated, commercially available graphite-based active carbons, only 40% of the NO are reduced.

The same test was carried out using $Al_2O_3$ as catalyst. To this end, $Al_2O_3$ was impregnated with 30% toluene diisocyanate residue and, after 1 hour at approximately 90° C., the impregnated $Al_2O_3$ was carbonized at 490° C. and activated at 800° C. Only 10% of the NO were reduced.

EXAMPLE 4

Behind a waste incinerator, 125 $m^3/h$ waste gas and ammonia were passed (spatial velocity 1,000 $m^3/m^3h$) through a 400 mm diameter column packed to a height of 1 m with 56 kg of the catalyst of Example 1 according to the invention. The temperature was between 120° C. at the bottom of the column and 140° C. at the head of the column which was electrically heated. The entry loads varied between 200 and 800 ppm NO. $NH_3$ was added in stoichiometric quantities. Approximately 88% NO were reduced.

It will be understood that the specification and examples are illustrative but not limitative of the present invention and that other embodiments within the spirit and scope of the invention will suggest themselves to those skilled in the art.

What is claimed is:

1. A carbon- and nitrogen-based catalyst consisting essentially of active carbon or active coke and comprising at least 90% by weight of graphite structures wherein at least 10% of the total pore volume is established by pores larger than 100 nm in diameter and having incorporated therein an isocyanate which forms C-N-ring structures, the percentage graphite content being at least 90% by weight.

2. A catalyst according to claim 1, wherein the catalyst additionally contains up to 1% by weight of vanadium oxide.

3. A catalyst according to claim 1, wherein the isocyanate comprises at least one of toluene diisocyanate, an oligomer of toluene diisocyanate and a residue from the production of toluene diisocyanate.

4. A process for the production of a catalyst according to claim 1, which comprises distributing over active carbon or active coke comprising graphite structures wherein at least 10% of the total pore volume is established by pores larger than 100 nm in diameter, a polymerizable isocyanate or isocyanate residue which forms C-N-ring structures, heating the active carbon or the active coke to a temperature of 80° to 150° C., subsequently conditioning it at 300° to 500° C., and then treating it with steam at a temperature of 700° to 900 C.

5. A process according to claim 4, wherein the proces is carried out in a rotary kiln.

6. A process according to claim 4, wherein active carbon is treated with isocyanate and heated to a temperature of 90° to 120° C., conditioned at a temperature of 350° to 450° C. and treated with steam at a temperature of 750° to 850° C.

7. A process for the production of a catalyst according to claim 1, which comprises mixing carbon powder or active carbon with a polymerizable isocyanate or isocyanate residue which forms C-N-ring structures, granulating the mixture, heating the granules to a temperature of 80° to 150° C. whereby the isocyanate or isocyanate residue polymerizes, conditioning the granules at 300° to 500° C., and then treating the granules with steam at a temperature of 700° to 900 C.

* * * * *